May 6, 1947.                    M. SCHICK                    2,420,265

TALISMAN CONTAINER

Filed Jan. 10, 1945

INVENTOR.
Max Schick
BY
ATTORNEY

Patented May 6, 1947

2,420,265

UNITED STATES PATENT OFFICE 2,420,265

TALISMAN CONTAINER

Max Schick, New York, N. Y.

Application January 10, 1945, Serial No. 572,160

1 Claim. (Cl. 40—19)

This invention relates to new and useful improvements in a talisman container, and has more particular reference to a container of this type which may be worn on a chain around one's neck.

The invention proposes to characterize the new and improved talisman container by the fact that it includes a tubular container having a side window opening and an open end. A rolled sheet of prayers, or other religious material is engaged within said container, and has a side area viewable through said side window opening. A cover is provided for normally closing said side window opening. A removable stopper normally closes the open end of said container.

The invention also contemplates the use of means on said stopper for gripping and turning said rolled sheet when said stopper is turned.

Another object of the invention is the construction of an article as mentioned which is simple and durable and which may be manufactured and sold at a reasonable cost.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 1:
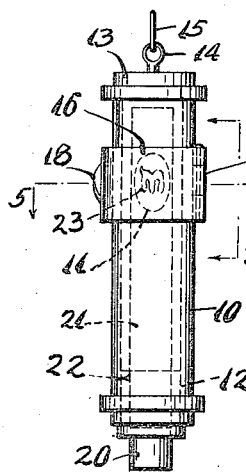
Fig. 1 is a side elevational view of a talisman container constructed in accordance with this invention.
Figure 2:
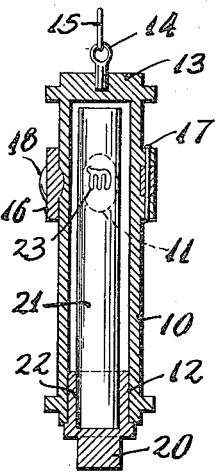
Fig. 2 is a central sectional view through Fig. 1.
Figure 3:
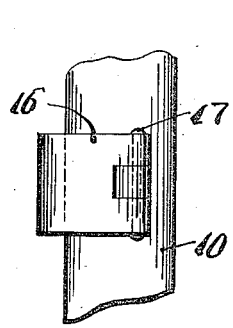
Fig. 3 is a fragmentary side elevational view looking in the direction of the line 3—3 of Fig. 1.
Figure 4:
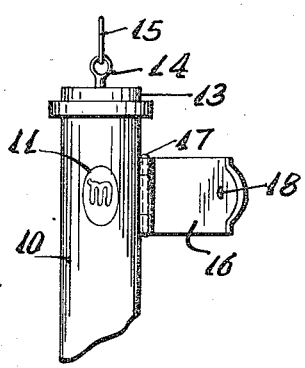
Fig. 4 is a fragmentary elevational view similar to Fig. 1 but illustrated with the cover open.
Figure 5:
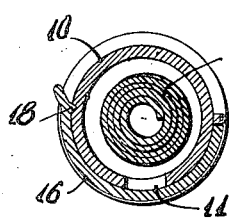
Fig. 5 is a horizontal sectional view taken on the line 5—5 of Fig. 1.

The talisman container, as disclosed in Figs. 1–5, inclusive, includes a tubular container 10 having a side window 11 and an open bottom end 12. The top of the container 13 is closed. The closed top is provided with an eye-like fastening 14 engaged by a link 15 intended to be engaged by a neck chain, or other ornamental chain.

A cover 16 is provided for normally closing said side window opening 11. This cover 16 is hinged upon one side of said container 10 by a hinge 17. The outer end of the cover 16 is provided with a latch-like projection 18 adapted to engage a complementary recess, or niche formed in the container 10 by which the cover 16 may be held in its closed position as illustrated, for example, in Figs. 1, 2 and 5.

A removable stopper 20 normally closes the bottom end 12 of the container 10. This stopper 20 frictionally maintains its position. A rolled sheet 21, preferably imprinted with religious material is housed within the container 10 and is supported in position by said stopper 20. The stopper 20 has a central hollowed out portion 22 into which the bottom end of the rolled sheet 21 engages. The rolled sheet 21 is provided with a symbol or letter 23, or other character, or other printed material which is normally fully or partially viewable through said side window opening 11.

It is intended that the talisman container be worn as a religious article. The cover 16 may be opened whenever desired and the letter or other printed material may be viewed through said window opening. The stopper 20 may be removed and the rolled sheet 21 examined and read.

Figure 6:
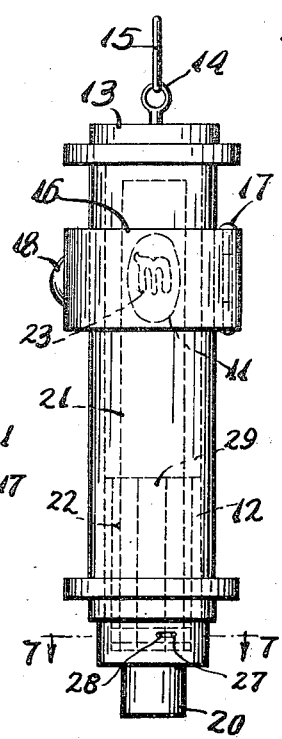
Fig. 6 is an elevational view of a talisman container constructed in accordance with a modified form of this invention, its lower part shown as a vertical section.
Figure 7:
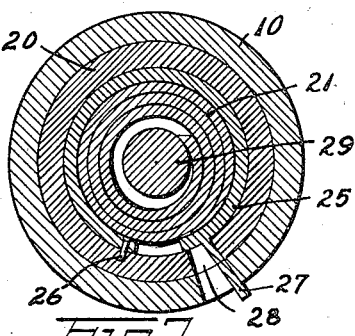
Fig. 7 is a horizontal sectional view taken on the line 7—7 of Fig. 6.

In Figs. 6 and 7 a modified form of the invention is disclosed which is very similar to the prior form, distinguishing merely in the fact that means has been associated with the stopper 20 by which the rolled sheet 21 may be gripped and turned when the stopper 20 is turned. This means includes a brake band 25 disposed axially within the stopper 20 and having one end fixedly attached to the stopper by a fastening element 26. The other end of the band 25 is free. The free end is provided with a pin 27 which projects through a slot 28 formed in the side of the stopper 20. The stopper 20 is also provided with a central core or other solid portion 29 around which the rolled sheet 21 is engaged.

Normally, the resiliency of the band 25 holds it in an open position. The cover 16 may be opened and the material 23 studied through the window opening 11. The pin 27 may be moved laterally so as to contract the band 25 which then grips the bottom portion of the rolled sheet 21. While this is taking place, the stopper 20 may be turned for turning the rolled sheet 21 and in this way the printed material 23 may be aligned with or moved away from the window opening 11, as desired. With this arrangement the printed material 23 may extend through a greater angular distance than the window opening 11.

While I have illustrated and described the preferred embodiment of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A talisman container comprising a tubular container having a side window opening and an open end, a cover for closing said side window opening, a removable stopper for closing said open end slidably fitting in said open end and having an internal bore for receiving a roll of paper talisman, said stopper having an integral stem extending upwardly into said container around which said paper talisman is adapted to be wound, said paper talisman being viewable through said window, said stopper having a transversely extending slot, and means on said stopper for gripping and turning said paper talisman when said stopper is turned including a resilient curled brake band within said stopper having one end fixedly attached to said stopper and having, at its other end, a pin extending through said slot, said other end of the band being free and said band resiliency being directed to normally urge said band to expand, whereby when said pin is moved in said slot said band grips said roll of paper talisman and forces it against said stem whereby said roll of paper talisman must rotate with said stopper.

MAX SCHICK.

REFERENCES CITED

The following references are of record in the file of this patent:

UNITED STATES PATENTS

| Number | Name | Date |
|---|---|---|
| 481,448 | Weeks | Aug. 23, 1892 |
| 1,473,654 | Sumner | Nov. 13, 1923 |
| 1,563,039 | Newell | Nov. 24, 1925 |
| 1,655,365 | Gurtov | Jan. 3, 1928 |
| 1,856,619 | Carsey | May 3, 1932 |
| 1,998,031 | Thomas | Apr. 16, 1935 |

FOREIGN PATENTS

| Number | Country | Date |
|---|---|---|
| 23,463 | British | Oct. 14, 1912 |